(No Model.)

W. S. FERGUSON.
BALL BEARING.

No. 548,118. Patented Oct. 15, 1895.

WITNESSES
Severance
Thomas K. Barley

INVENTOR
William S. Ferguson.
by his Attorneys

UNITED STATES PATENT OFFICE.

WILLIAM S. FERGUSON, OF SEDALIA, MISSOURI.

BALL-BEARING.

SPECIFICATION forming part of Letters Patent No. 548,118, dated October 15, 1895.

Application filed March 8, 1895. Serial No. 540,978. (No model.)

*To all whom it may concern:*

Be it known that I, WILLIAM S. FERGUSON, a citizen of the United States, residing at Sedalia, in the county of Pettis and State of Missouri, have invented certain new and useful Improvements in Ball-Bearings; and I do hereby declare the following to be a full, clear, and exact description of the invention, such as will enable others skilled in the art to which it appertains to make and use the same.

My invention relates to improvements in ball-bearings; and it consists of the combination of two members, one formed of a plate having a grooved projection and the other formed of a plate having a grooved flange surrounding said projection, balls in said grooves and uniting said members, but allowing them to rotate freely and independently of each other, and means for introducing the balls into the grooves.

It also consists of certain other novel constructions, combinations, and arrangements of parts, all of which will be hereinafter more particularly set forth and claimed.

Figure 1:
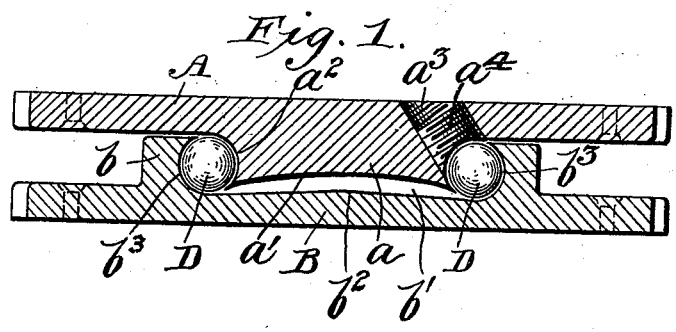
Figure 2:
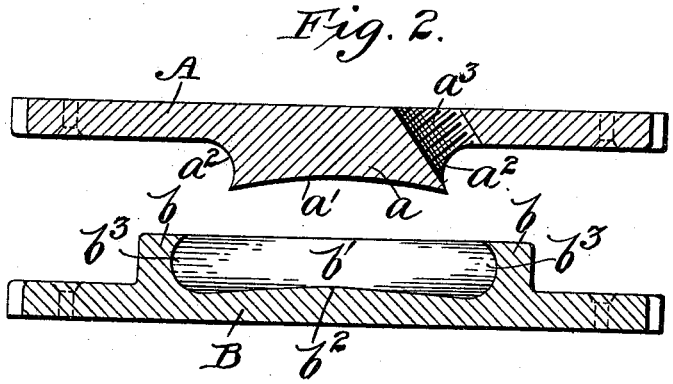
Figure 3:
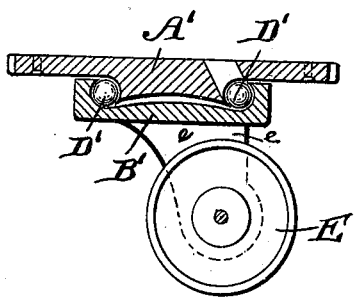

In the accompanying drawings, forming part of this specification, Figure 1 represents a central vertical section of a bearing embodying my invention. Fig. 2 represents the same with the balls removed and the two members of the bearing separated, and Fig. 3 represents a central vertical section of my said invention applied to a caster.

A in the drawings represents one member of the bearing provided with a grooved projection or hub, and B the member provided with a grooved flange.

The member A, as shown in Figs. 1 and 2, is a flat plate, preferably rectangular in form. It is provided upon its under side at its center with a projection or axle $a$, preferably having a concave under surface $a'$ and also a peripheral annular shallow groove $a^2$, within which the balls D are adapted to travel.

The member B, as shown in Figs. 1 and 2, is composed of a flat plate having upon its upper surface an annular peripheral flange $b$, forming a recess $b'$, said recess preferably having a convex bottom $b^2$ and adapted to receive the axle $a$ when the members are assembled. The inner vertical face of the flange $b$ is provided with a shallow annular groove $b^3$, which, when the members are assembled, faces the groove $a^2$, and the balls D rest in both grooves and lock said members together, but allow them to rotate freely and independently of each other.

As a preferable means of introducing the balls into the grooves $a^2$ $b^3$, the plate A is provided with an inclined passage $a^3$, terminating at its lower end in the groove $a^2$. This incline passage is preferably screw-threaded internally to receive a screw-threaded plug $a^4$, having its end formed to correspond with the curvature of the groove $a^2$, and thus prevent the balls from passing out of the grooves after they are once in place, but the plug $a^4$ may be smooth and tightly driven into the passage $a^3$. The two members are placed, together with the axle $a$, within the recess $b'$, and the balls are then introduced into the oppositely-faced grooves $a^2$ $b^3$ through a passage $a^3$, and the two members A and B are thus locked together, as the distance between either the inner upper edge of the flange $b$ and the bottom of the groove $a^2$ or the lower edge of the axle $a$ and the bottom of the groove $b^3$ is less than the diameters of the balls.

The members A and B are each provided with screw-holes or any other suitable attaching means by which they may respectively be attached to casters, revolving book-cases, turn-tables, revolving chairs, or any article or machine in which it is desired to provide an antifriction-bearing.

In Fig. 3 I have shown one application of my invention—that is, to a caster for furniture or other articles. In this application a suitable roller or wheel E is journaled in hangers $e$ on the lower member B' of the bearing at a point inside the circle of the balls, thus distributing the weight evenly over all the balls. Said member is similar to member B, except that it is preferably circular in form and has not the wide attaching-flange. The upper member A' is preferably circular in form and is provided with a suitable perforated flange, by which it can be attached to any article of furniture. In such an application the plug $a^4$ is omitted, as the article to which the caster is attached will close the passage $a^3$. This member A' is similar to member A, with the exception of the plug $a^4$. Balls D', similar to balls D, are applied between members A' and B'. If it is desired to use oil in the bearing, the same will be kept always in the channel $b^3$ by means of the convex bottom $b^2$.

The diameters of the balls D and D' are greater than the height of the axle of one member or the flange of the other, and consequently the lower side of said axle cannot come in contact with the top of the lower member, nor can the upper side of the flange come in contact with the upper member, and thus create additional and injurious friction.

Having now described my invention, what I claim as new, and desire to secure by Letters Patent, is—

1. In a ball bearing, the combination of two members; one formed of a plate having a grooved projection, and the other of a plate having a grooved flange surrounding said projection, and balls of a greater diameter than the height of either the grooved projection or the grooved flange and which rest partly in each of said grooves, and thereby locking said members together, but allowing them to rotate freely and out of contact with each other, substantially as described.

2. In a ball bearing, the combination of two members; one formed of a plate having a grooved projection and a ball introducing passage leading into said groove, and the other formed of a plate having a grooved flange surrounding said projection, and balls of a diameter greater than the height of either the grooved flange or the grooved projection and resting in said grooves and locking said members together, substantially as described.

3. In a ball bearing caster, the combination of two members, one formed of a plate having a grooved projection, and the other formed of a plate having a grooved flange, and a wheel or roller, and balls of a greater diameter than the height of either the grooved projection or the grooved flange and which rest in the grooves of said members and thereby lock said members together but allow them to move freely and out of contact with each other, substantially as described.

4. In a ball bearing, the combination of two members; one formed of a plate having a grooved projection and the other formed of a plate having a grooved flange surrounding said projection and a concave upper surface, and balls of a greater diameter than the height of either the grooved projection or the grooved flange and which rest in each of said grooves and thereby lock said members together, the construction being such that the oil in the bearing will drain down the concave surface into the groove of the flange and thus lubricate the balls, substantially as described.

5. In a ball bearing caster, the combination of two members; one formed of a plate having a grooved projection and screw holes for attaching it to an article, and the other formed of a plate having a grooved flange, hangers having journal ends which lie within the circle of the grooved flange, and a wheel or roller journaled in said hangers, and balls of a greater diameter than the height of either the grooved projection or the grooved flange and which rest in said grooves and thereby lock said members together, substanially as described.

In testimony whereof I affix my signature in presence of two witnesses.

WILLIAM S. FERGUSON.

Witnesses:
J. H. RODES,
ORVILLE M. BARNETT.